Sept. 5, 1939.   C. P. GALANOT ET AL   2,171,547
TRACTION DEVICE
Original Filed Dec. 14, 1934   5 Sheets-Sheet 1
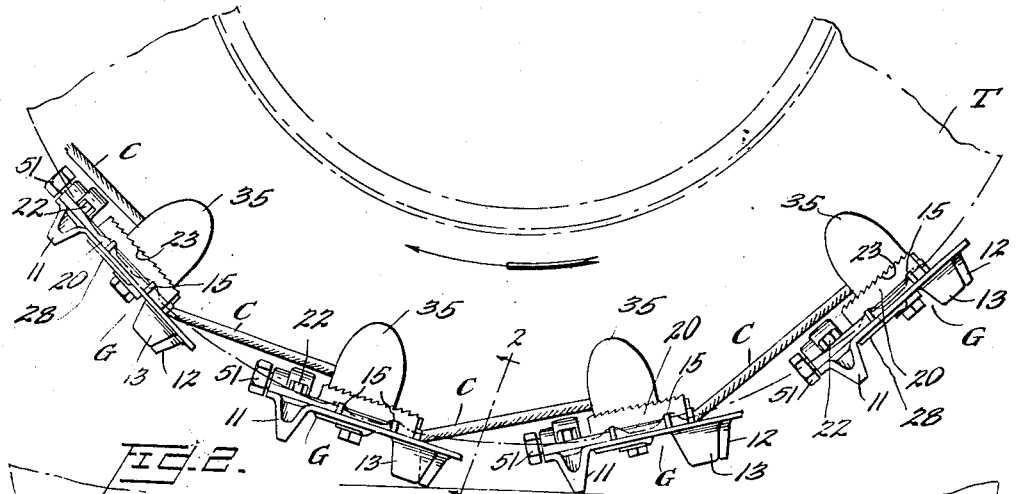
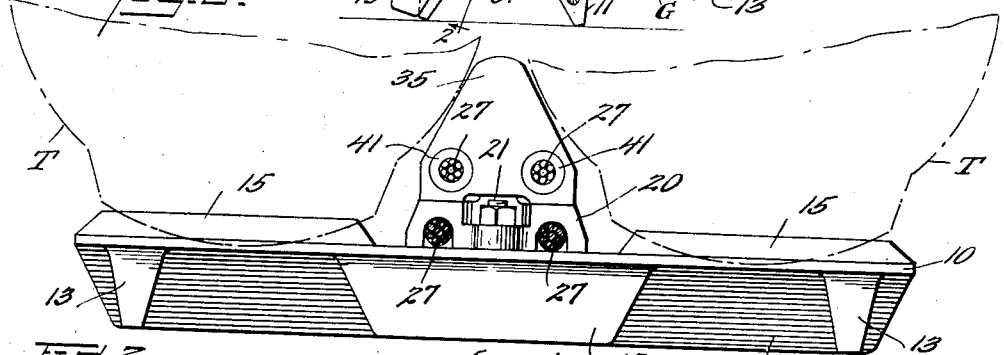
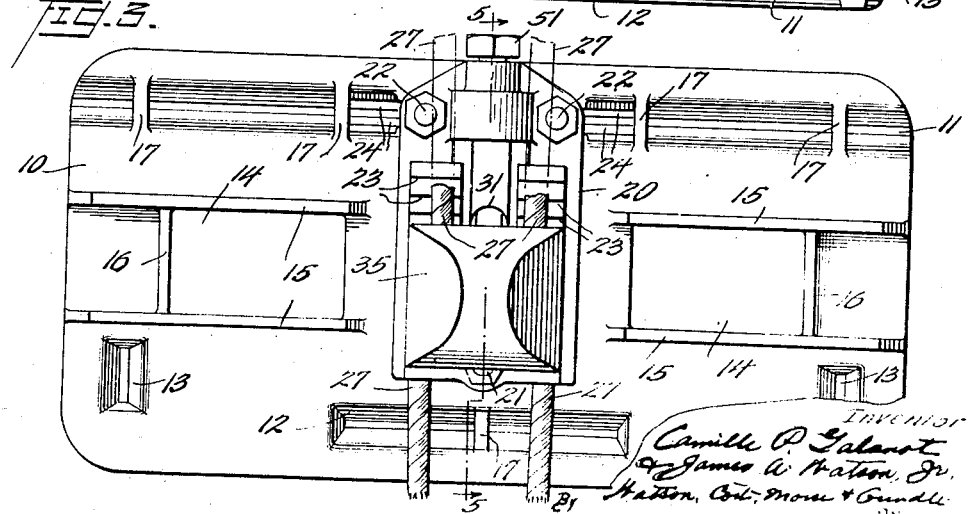

Sept. 5, 1939.  C. P. GALANOT ET AL  2,171,547
TRACTION DEVICE
Original Filed Dec. 14, 1934  5 Sheets-Sheet 2
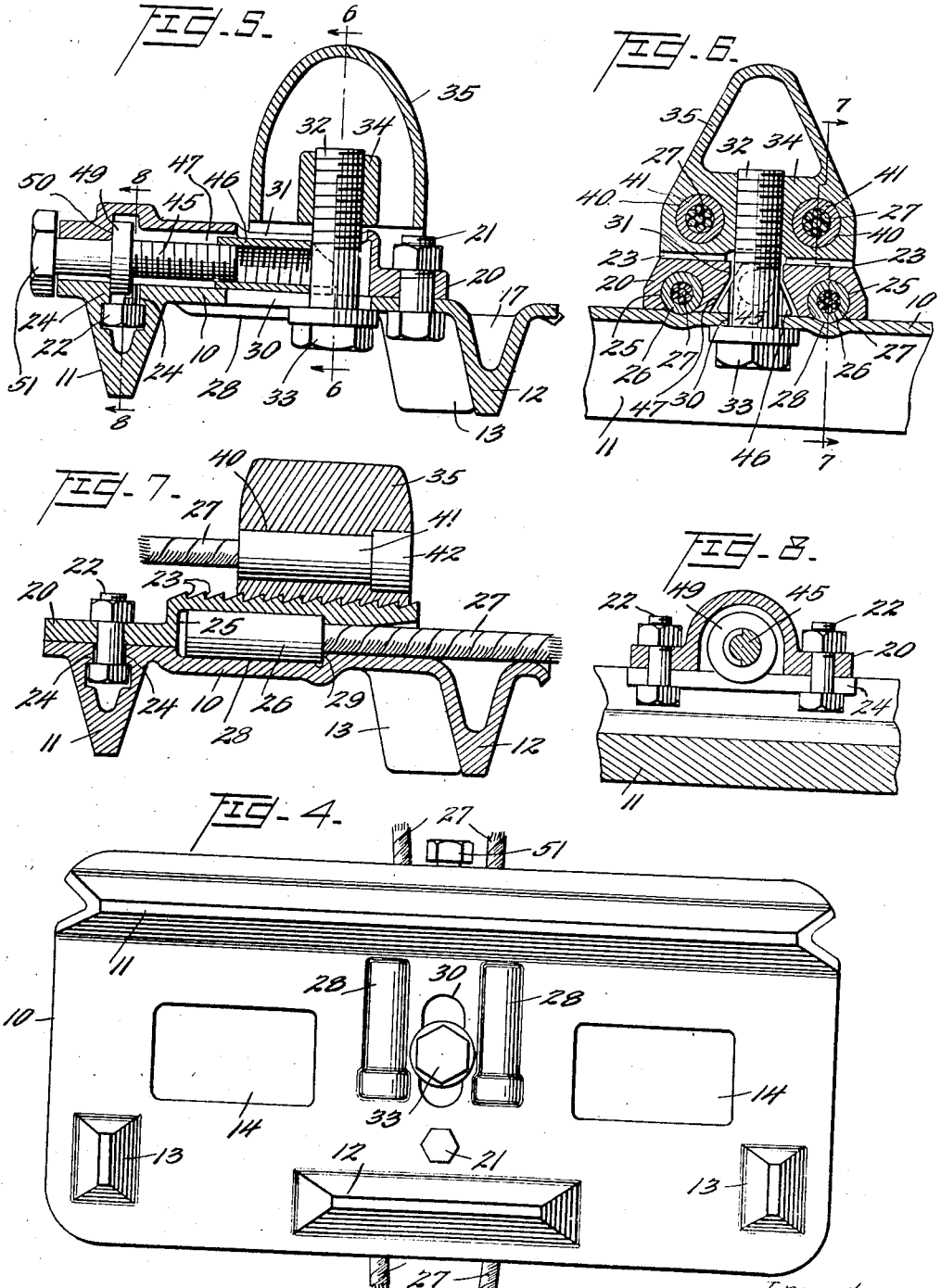

Sept. 5, 1939. C. P. GALANOT ET AL 2,171,547
TRACTION DEVICE
Original Filed Dec. 14, 1934 5 Sheets-Sheet 3
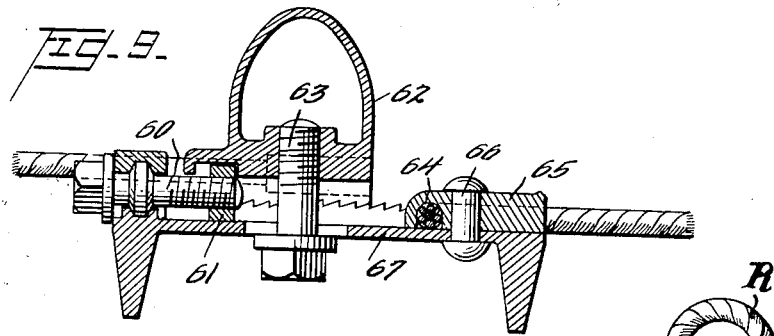
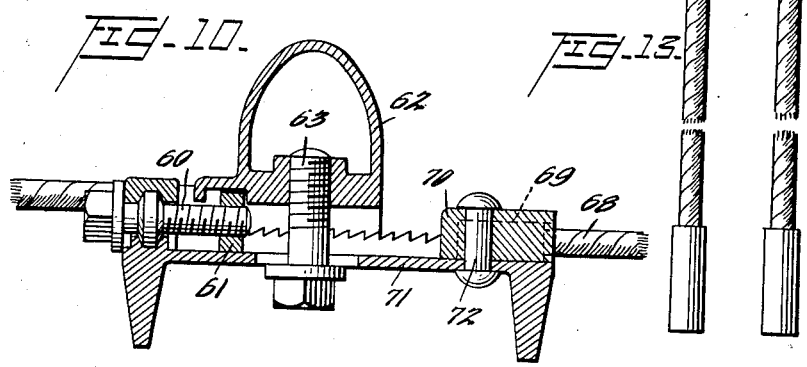
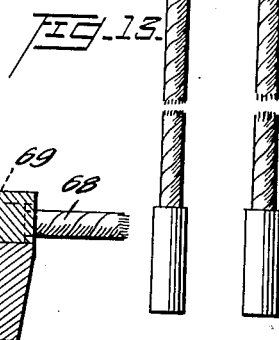
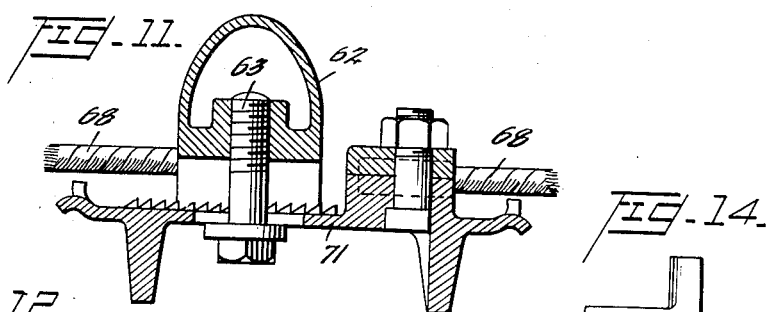
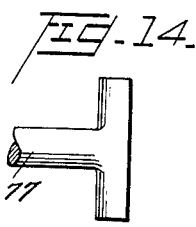
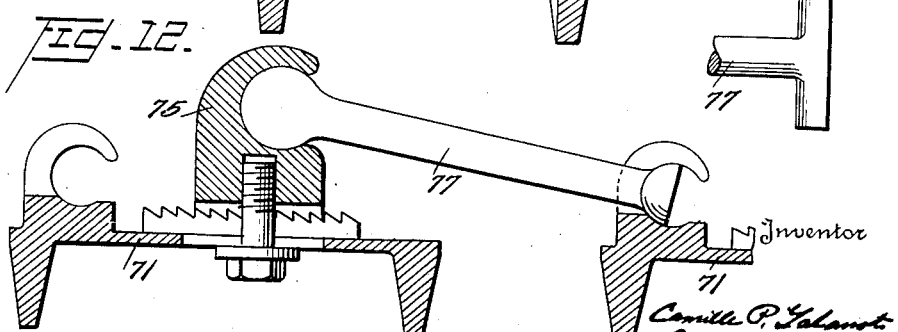

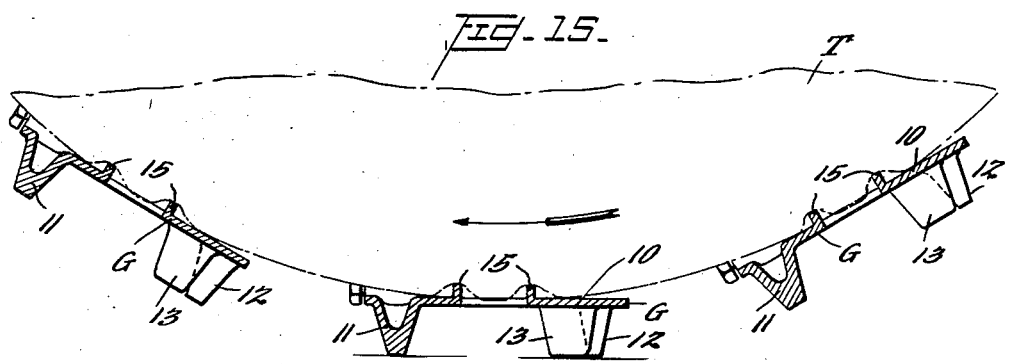
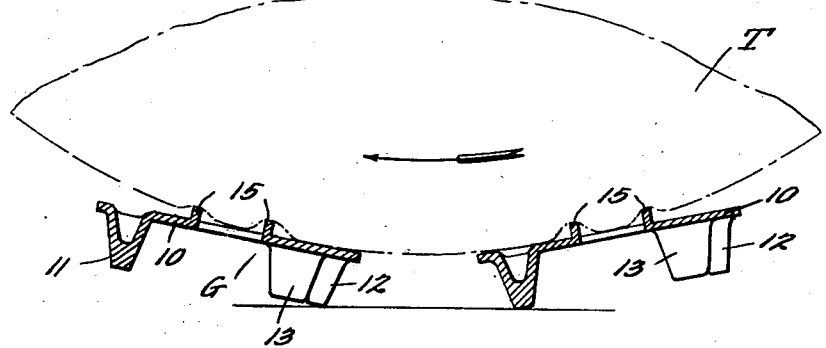

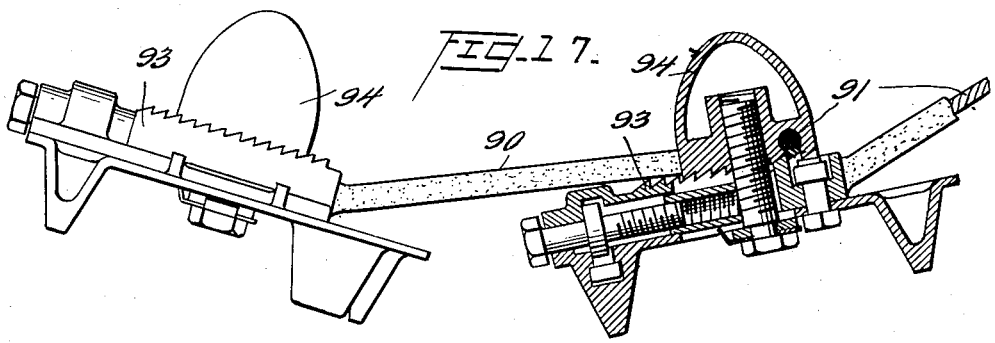
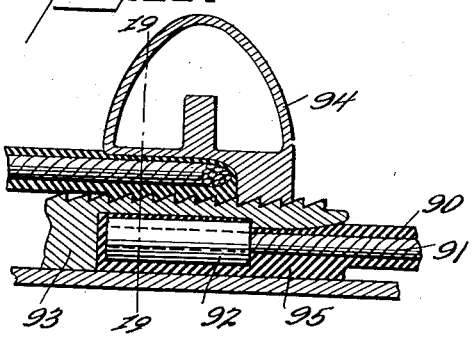
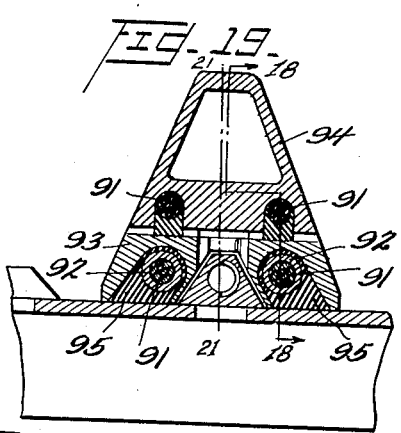
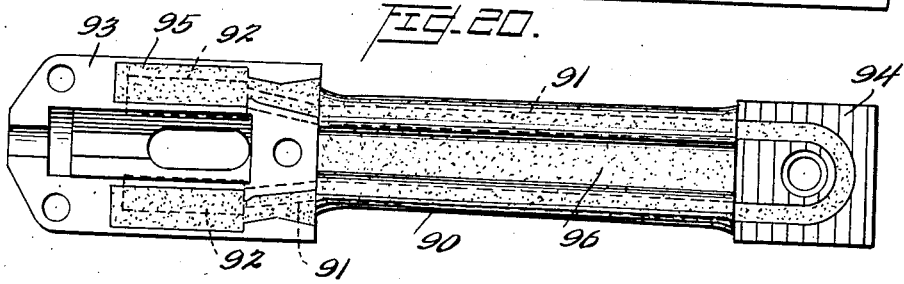
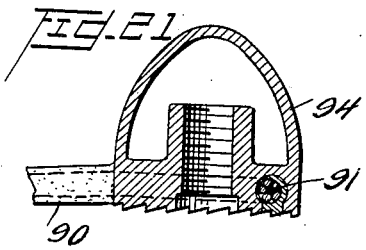
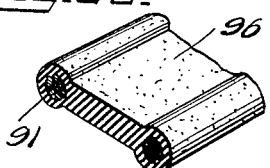

UNITED STATES PATENT OFFICE 2,171,547

TRACTION DEVICE

Camille P. Galanot, Youngstown, Ohio, and James A. Watson, Jr., Silver Spring, Md.

Application December 14, 1934, Serial No. 757,564
Renewed November 23, 1938

9 Claims. (Cl. 152—220)

This invention relates to traction devices and particularly to traction devices for use in connection with vehicle wheels of the dual tire type.

The increasing use of motor driven pneumatic tire vehicles in the hauling and towing of heavy loads, at all seasons of the year, and over all kinds of ground and road surfaces, has made it increasingly important to provide, for use as accessories thereto, traction devices for increasing the traction and flotation of the wheels where the vehicle must necessarily pass through mud, sand, or over soggy ground. It is likewise essential that means be provided for increasing the traction of such wheels when the vehicle with which they are associated encounters surfaces covered with ice and snow or encounters ground which is soft and slippery upon its upper surface only and harder underneath. Likewise it is sometimes essential to increase the traction of the wheels when the vehicle is passing over hard, dry ground but having steep grades with which the ordinary pneumatic tires have insufficient frictional engagement.

Many types of such auxiliary traction devices have heretofore been designed or suggested and certain of such devices have been actually placed in use. Such prior devices have, however, failed for one reason or another to meet all modern requirements, particularly the requirement that they shall satisfactorily function when applied to vehicles equipped with high powered driving motors and compounded driving gear ratios and which must be necessarily operated at the highest possible speed permissible under such circumstances as may exist while at the same time pulling heavy towed loads. In accordance with the present invention, a traction device is provided which is primarily intended for application to a vehicle wheel of the dual pneumatic tire type but certain features thereof will be further useful in connection with traction devices to be applied to wheels of the single tire type, as will be apparent to one skilled in the art. Inasmuch as the traction device is normally carried by the vehicle and comprises an additional load for the vehicle, it should be light in weight. Lightness is also a major necessity for successful operation on account of the centrifugal forces encountered. As it must necessarily be frequently applied to the wheel and as frequently detached therefrom, it should be easily attachable and detachable.

The traction device contemplated by the present invention complies with both of these requirements and, furthermore, has the advantage that it may be applied to a wheel and detached therefrom without the use of special tools of any nature and by motor vehicle operators who are not mechanically skilled and, when necessary, by an individual, unassisted operator. Another advantage of the invention is that the device may be quickly and easily divided into small, very light units to facilitate handling and storing.

Further advantages of the invention reside in its ability to be readily adjusted upon application and at any time thereafter to wheels and tires of various sizes, without the aid of special tools, in order to get the necessary tightness or driving contact between the device and the wheel upon which it is mounted. That this is an important advantage will be clear to those skilled in the art, the bulk of traction devices heretofore provided and which have sufficient engaging or gripping effect having been so designed and constructed that slipping between the tire surface and the traction device occurs whenever a high powered vehicle encounters mud, unless chains or other appliances are utilized to positively attach the traction device to the body of the wheel. This is especially true when towing a heavily loaded vehicle. The use of such chains or attaching devices is undesirable in that they further complicate the structure, are subject to breakage, and cause the wheel loading to become unbalanced and create premature tire wear.

The present invention contemplates a traction device comprising a plurality of spaced grousers and a series of members alternating therewith which serve to flexibly connect the grousers into a circular series extending around the wheel. Parts of the device are so designed that they may be readily extended or contracted to accommodate the device to wheels of different diameters, and the device may be readily extended by the addition of grouser plates and connecting members so as to run over two wheels mounted to rotate about parallel axes, i. e. may function as a traction device for vehicles having the well-known bogie suspension.

All parts of the traction device are readily replaceable in the field, it being highly advantageous that field repairs may be made where necessary, in order that no time may be lost in returning the device to a shop or repair center for repairs. The tightening or loosening of the traction device about the wheel to which it is applied may be effected by manipulating adjusting means carried by the device, each grouser having an individual adjusting device permanently mounted thereon and by means of which the distance between such grouser and the next adjacent grouser may be regulated. If the device is to be tightened upon its associated wheel, by taking up a substantial amount of play, a number of the adjusting devices may be manipulated and in this way adjustment effected, while maintaining the grousers spaced substantially equidistantly from each other, which is desirable in order to maintain the proper balance of weight around the wheel and to maintain the shocks of impact of the successive grousers against the ground surface substantially equal in magnitude. Any individual grouser with its corresponding connecting means may be added to, or taken from the existing assembly of units to lengthen or shorten the device sufficiently to properly fit tires on wheels of widely varying diameters.

Several parts of the traction device are so designed that the device as an entirety is extremely rugged and well able to withstand the most severe tests to which it is placed in use. Vibrations or shocks to which it is subjected, for instance, when the vehicle to which it is attached is moving rapidly over a hard surfaced road, will not result in loosening of the traction device about the wheel, an important feature of the invention. Flexible members are employed to connect the several grousers and these connecting members are of such nature that they will not stretch in use nor do they have any frictional or wearing surfaces through which tension is transmitted, elongation of the device during use being therefore impossible. Preferably, the several grousers are connected together by connecting members which comprise parallel wire cables or ropes and, by preference, the several such cables or ropes are pre-stretched so that subsequent elongation or stretching will not occur.

A feature of the invention consists in the use of adjusting members and securing members which are threaded, but which are so applied to the grousers that, after the device as a whole has been properly positioned upon a vehicle wheel, none of the threaded members are in tension. Hence, the possibility that the device as an entirety will lengthen or stretch in use due to the yielding of the treads of threaded members is wholly eliminated. Many types of prior devices of this general nature include threaded members which are placed in tension and experience has demonstrated that gradual loosening of the device as an entirety about a vehicle wheel cannot be avoided where turn-buckles and the like are utilized, the threaded members of the turn-buckles, etc. being placed in tension upon the tight application of the device to the wheel.

The present traction device includes no small locking pins or other easily displaced parts. The grouser plates are so designed that they may be readily fabricated at relatively small cost by casting, forging, or stamping processes. These plates are so formed that they are self-cleaning and will not retain mud, characteristics which materially decrease the efficiency of any such traction device when present. The grouser plates are likewise so formed, and so spaced apart, that the distance between the ground engaging cleats of one grouser shoe or plate is substantially equal to the distance between the adjacent ground engaging cleats on adjacent grouser shoes or plates. The successive impacts of the cleats against the ground are therefore of substantially the same magnitude and the vehicle is subjected to a minimum of shock, even when travelling at high speed over a hard surfaced road. This even spacing also prolongs the grouser life. The inner faces of the grouser plates or shoes are provided with tire engaging ribs which, when the device as a whole is properly mounted upon a wheel, are embedded into the outer portion of the surface of the pneumatic tire. There is no "creep" of the traction device around the tire, although there may be a slight movement circumferentially on the tire due to flowing of the rubber over the tire engaging ribs, particularly when the torque applied to the axle of the vehicle is great, such as when towing another vehicle through deep mud or sand.

The several grouser plates or shoes have no substantial rocking or pivotal movement with respect to the vehicle tire, such movements as the plates have with respect to the tire surface resulting only from distortion of the tire itself as the grousers successively contact with the ground surface and are thereafter lifted from engagement therewith. This absence of pivotal movement materially lengthens grouser life and also materially influences the smoothness and quietness of the operation especially on hard surfaces and allows a much greater speed to be maintained without damage to itself or to the vehicle, inasmuch as the grouser is placed on the ground by the revolving wheel rather than thrown forcibly at the ground by the revolving wheel.

The essential features of the invention may be embodied in types of traction devices which vary considerably in the design and arrangement of their component elements and in the accompanying drawings several such embodiments are illustrated by way of example.

In the drawings:

Figure 1 illustrates in side elevation a portion of a traction device embodying the invention, the wheels to which the device is applied being illustrated in chain lines;

Figure 2 is a section on line 2—2 of Figure 1, parts being shown upon a somewhat larger scale;

Figure 3 is a plan view of one of the grousers;

Figure 4 is a bottom view of one of the grousers;

Figure 5 is a section on line 5—5 of Figure 3;
Figure 6 is a section on line 6—6 of Figure 5;
Figure 7 is a section on line 7—7 of Figure 6;
Figure 8 is a section on line 8—8 of Figure 5;

Figure 9 is a section similar to the section illustrated in Figure 5, but through a somewhat modified type of grouser;

Figures 10, 11, and 12 are views similar to views 5 and 9 but taken through further modified forms of the grousers respectively;

Figures 13 and 14 are plan views of portions of two different types of connecting members respectively;

Figures 15 and 16 are rather diagrammatic views showing the several positions which the grousers successively occupy as they contact with and leave the ground surface;

Figure 17 is a view generally similar to Figure 1 but showing two elements of a somewhat different form of traction device applied to a wheel;

Figure 18 is a section through portion of a guide, ratchet plate and grouser such as shown in Figure 17 on line 18—18 of Figure 19;

Figure 19 is a section on line 19—19 of Figure 18;

Figure 20 is a plan view of the connecting element shown in Figure 17, including the attached guide and ratchet plate;

Figure 21 is a section on line 21—21 of Figure 19; and

Figure 22 is a perspective view of portion of a connecting element.

The traction device comprises essentially a series of grousers, generally indicated at G in Figure 1 and a series of connecting members indicated at C in this figure. It will be understood that the series is continuous around the vehicle wheel to which the device is applied, though not so illustrated in Figure 1, the grousers alternating with the connecting members. Each grouser comprises a grouser plate 10 which is preferably rectangular in form, as shown in Figures 3 and 4, and is sufficiently wide to not only bridge the gap between two adjacent tires T and T' (Figure 2) of a wheel of the pneumatic tire type, but also to provide ample bearing surfaces for the tire treads even when flattened somewhat when those portions of the tire treads in contact with the grouser are transmitting the weight of the vehicle thereto and hence to the ground. Along one edge of the grouser plate or shoe is formed a continuous ground engaging cleat 11 and along the opposite edge are three engaging cleats, a central, relatively long cleat 12 parallel to cleat 11, and outer cleats 13 which may be disposed at right angles to cleat 11 to increase the resistance of the grouser to lateral sliding movement relatively to the ground surface. Apertures 14 are formed in the grouser plate and are so positioned as to directly underlie the tread surfaces of the tires.

Upon its upper surface each grouser plate is provided with parallel tire engaging ribs 15 extending along the margins of apertures 14 respectively, ribs 15 being connected by strengthening or bracing ribs 16. The grouser plate described may be formed by casting, stamping, or pressing operations insofar as the essential features mentioned are concerned. It will be appreciated that minor changes in design may be effected in order to render the plate more readily suitable for fabrication by any chosen process of manufacture. Desirably, strengthening ribs 17 are provided which bridge the elongated depressions formed in the plate in the production of the ground engaging cleats, these depressions being formed, regardless of the method of manufacture, in order that the grouser may be as light as possible. The cleat 11 is cut away or bevelled at its ends, as shown clearly in Figures 2 and 4, to eliminate projecting corners which might interfere with other vehicle parts when the traction device is applied. In general, the plate is so designed and constructed as to present a member of desired arrangement and necessary strength while being relatively light in weight.

Affixed to the upper side of each grouser is a plate 20, any suitable means being utilized to rigidly secure this plate to the grouser in the position in which it is shown. In the form of the invention illustrated in Figures 1–8, the plate is shown to be attached to the grouser or shoe by means of bolts, a single bolt 21 securing one end of this plate and two spaced bolts 22 securing the other end of this plate to the grouser plate. Plate 20 will be hereinafter designated the ratchet plate since it bears upon its upper surface a series of teeth or serrations 23, which resemble ratchet teeth. The bolt 21, as will be seen from Figure 5, passes through aligned apertures in the grouser and ratchet plates, and the bolts 22 pass through apertures in the ratchet plate and have their heads retained within T-shaped slots formed in the grouser plate, these T-shaped slots resulting from the provision of flanges 24 which overhang the central portion of the groove or depression within the continuous rib 11.

The ratchet plate is provided with generally cylindrical apertures 25, the axes of which are parallel and extend fore and aft of the grouser, these apertures receiving cylindrical members 26 which are mounted upon and firmly secured to the ends of flexible wire cables 27. As may be perceived from an inspection of the drawings, the cylindrical members 26 project below the lower surface of the ratchet plate 20 and the upper surface of the grouser plate 10 is provided with depressions 28 which receive the lower portions of members 26 and permit the lower surface of the ratchet plate to have tight contact with the upper surface of the grouser plate. The grouser and ratchet plates are thus provided with registering recesses which, taken together, form a snug cylindrical housing for the cable and anchoring devices 26, these devices being held against axial movement when the cables 27 are placed under tension by reason of the engagement of their annular end surfaces with continuous annular shoulders 29, each shoulder being formed in part upon the ratchet member 23 and in part upon the grouser plate 10.

The grouser and ratchet plates are provided with registering elongated slots 30 and 31 extending in a fore and aft direction or at right angles to the cleat 11 and projecting through these registering slots is a locking bolt 32 the lower end of which is provided with a head 33 engaging the under surface of the plate and the upper end of which has threaded engagement with an aperture formed in a central guide member 34 of the guide member 35. Guide member 35 is generally conical in shape and adapted to extend into the gap between tires T and T' and, by contacting with the side walls of these tires, to prevent sliding movement of the grouser with respect to the tires and wheel of the grouser. Guide 35 is provided with serrations or teeth on its lower surface which are adapted to mesh with the serrations or teeth 23 formed on the ratchet plate 20, and the locking bolt 32 may be either released to permit movement of the guide 35 along the ratchet formed on ratchet plate 20, or tightened to rigidly and securely hold this guide to any position to which it may be adjusted along the ratchet, the relative movements of guide 35 and the grouser being limited to the length of slots 30 and 31.

As will be seen from an inspection of Figures 6 and 7, the lower portion of the guide 35 is provided with parallel bores 40 to receive cylindrical members 41, these members having enlarged heads 42 which are received snugly within enlargements at the ends of the bores 40. Members 41 are cylinders generally similar to cylinders 26 except in that they are provided with the heads 42 and are rigidly secured and firmly anchored to the ends of flexible wire cables 27, these cables, of which there are two, each having therefore a cylindrical attaching device 41 secured to its opposite end. By means of attaching device 26, a cable 27 is firmly attached to one of the grousers and, by means of the attachment device 41, is as firmly attached to the guide 35 which is associated with the next adjacent grouser. It may therefore be said that each connecting member has one end firmly secured to one grouser and its other end adjustably secured to the next adjacent grouser.

The ratchet plate 20 also cooperates with the grouser plate 10 in housing and retaining a jack for effecting tightening of the traction device after it has originally been applied to a wheel. Each of these jacks includes a screw bolt 45 and a sleeve 46 having threaded engagement with this bolt. The end of sleeve 46 which is remote from the screw bolt is cut away to receive the locking bolt 32 and the sleeve is non-rotatably, yet slidably, supported in the channel 47 formed centrally in the ratchet plate 20, as shown in Figure 6. The screw bolt 45 has a collar 49 integral therewith which rests against, when any tightening operation is being effected, an annular shoulder 50 formed partially upon the ratchet blade and partially upon the main plate 10 of the grouser. Shoulder 50, therefore, comprises an abutment and the thrust of the screw jack is embedded to this abutment when the screw bolt 45 is rotated to effect a thrust against a locking bolt 32. At its outer end, the screw bolt 45 is formed with a head 51 which may be polygonal so as to be readily engageable and rotatable by any standard type of adjusting tool, such as a wrench. Naturally, the screw jack just described will not be operated until the locking bolt 32 has been released at least sufficiently far to permit movement of the guide 35 along the ratchet teeth 23.

When the device is disassembled into separate units, each grouser will have attached to it by connecting cables 27, the guide member 35 which is to be applied to the next adjacent grouser during the process of assembly. Naturally, in effecting assembly, several guides 35 are connected to the grousers by means of the locking bolts with the exception of one guide the connection of which to the associated grouser is not effected until the traction device has been completely applied to the wheel, this final attachment effecting closure of the traction device. After the circular series of grousers and flexible connecting members have been completed, the adjusting jacks may be called into operation to properly tension the device on the wheel, any number of these jacks being operated as desired. In each instance, of course, the associated guide 35 will be advanced along ratchet teeth 23 as far as it may be moved manually and the associated guide will be only loosely retained by its locking bolt 32. In each instance of adjustment or tightening, the movement of the jack will be continued until the inter-engaging ratchet teeth of guide and ratchet plate are in full engagement, as it is not desired that the jack itself transmit to the grouser any of the tension of the connecting members during the ordinary operation of the device. In other words, the jack associated with each grouser is employed, in tightening the device on a wheel, to advance the associated guide a full tooth engaging position and thereafter may actually be retracted, the locking bolt 32 maintaining the guide in this position. During the operation of the device, should it appear necessary or desirable to effect further tightening, any one of the jacks may be operated to advance the associated guide one full ratchet tooth. If a considerable amount of tightening is to be effected, several of the jacks are operated, so that there is no exclusive take up at any one point around the wheel.

In the form of the invention illustrated in Figure 9, the jack comprises a screw bolt 60 which is generally similar to the screw bolt 55 previously described, and the sliding nut 61 having threaded engagement with the forward end of the screw bolt. Nut 61 is non-rotatable and, as may be clearly observed, bears against the guide 62 directly, instead of against the locking bolt 63. With this form of grouser, a connecting member such as indicated at R in Figure 13 may be used, the ends of the connecting member being attached to a guide 62 and its mid-section being curved as shown and lying within U-shaped recess 64 formed in member 65 rigidly attached by means of a rivet or bolt 66 to the grouser plate 67. Or, as shown in Figure 10, the U-shaped connecting cable or member may be dispensed with and the connection may be effected by means of two entirely separate spaced parallel cables, one of which is indicated at 68, the ends of the cables being provided with cylindrical attachments 69 which are housed in recesses formed in the plate 70 secured to the grouser plate 71 by a rivet 72. In the forms of the invention shown in Figures 9 and 10, and also in the form of the invention shown in Figure 11, the ends of the connecting cables are substantially equally spaced from the grouser plate instead of being one above the other as in the case of the form of the invention first described.

In the form of the invention shown in Figures 12 and 14, the guide member 75, which is detachably and adjustably mounted upon the grouser plate 71, is connected to the leading edge of the succeeding grouser plate by means of a link 77. The ends of this link are so formed as to have spherical bearing contact with the parts to which they are attached, permitting these parts to move relatively to each other in the plane of the wheel to limited distances, as the vehicle is operated. However, I prefer to use the cable connections shown in the previous figures of the drawings, inasmuch as this eliminates wear incident to movement of one bearing surface over another while the connecting members are under tension.

The diagrammatic Figures 15 and 16 illustrate the grousers in their various possible relative positions due to rotation of the wheel to which they are applied. The wheel in each case rotates in the direction of the arrow applied to the figure. The cleat which first strikes the ground surface is the elongated or continuous cleat although, under special circumstances, the grousers may be reversed so that this cleat is the last to contact with the ground surface as the wheel advances. While under certain conditions the traction device may be so applied that the tire engaging ribs only lightly indent the resilient rubber tread surface of the tire, I generally prefer to maintain such tension in the connecting members that the tire engaging ribs of the grousers are impressed into the tread surface substantially to the extent illustrated in these figures. This insures against slippage of the traction device relative to the tires when a large torque is applied to the wheels.

By comparing Figures 15 and 16, it will be observed that each grouser rocks slightly as it contacts with the ground and rocks slightly in the reverse direction as it leaves the ground. This rocking motion, however, results only because of the resiliency of the tire to which the device is applied, the leading tire engaging rib being further pressed into the resilient tread surface as the leading cleat strikes the ground, the following rib being slightly retracted from the tire. The reverse is of course true as the grouser is about to leave the ground, as shown clearly in Figure 16. This slight relative rocking movement of the grousers is effective in preventing the caking of mud intermediate the same. It also facilitates discharge of mud which may be caked in between the cleats of any one grouser, the tread surface of the tire also assisting in the removal of the mud from between the cleats by working downwardly, to a certain extent, through the apertures 14 or acting to force mud downwardly through these apertures and to eject mud cakes on the lower surfaces of the grousers.

The traction device illustrated in Figures 17 to 22 is generally similar to that shown in Figures 1, 2, and 3 but embodies a number of modified details of construction. In this form of the invention, the connecting element 90 comprises a continuous length of cable 91 arranged as a U, the attachment members 92 being secured to the ratchet plate 93 and not in part to the ratchet plate and in part to the grouser plate, as before, the grouser plates being flat beneath the ratchet plate. The mid-section of the cable lies in a semi-circular groove formed in the under surface of the guide 94. The attachment members 92 and adjacent portions of the cable lie in undercut grooves formed in the ratchet plate, as indicated in Figures 19 and 20 and are retained therein by suitable means, preferably by rubber vulcanized to the walls of the grooves and to the attachment members and cables themselves, as indicated at 95. The mid-point of the cable is likewise secured within the groove formed in the guide member. The parallel reaches of cable between the ratchet plate and guide are encased within rubber, a layer of rubber enclosing each and these layers being interconnected by a web of rubber 96.

In assembling the parts comprising the device, the ratchet plate 93, guide 94 and cable 91 are arranged as shown in Figure 20, the surfaces of these elements to which it is desired rubber to adhere being suitably prepared, as by plating with brass, crude rubber strips properly positioned and a heated mold applied to effect shaping and vulcanization.

After vulcanization, the guide, ratchet plate and cable comprise in reality one continuous member, being permanently secured together. In assembling the traction device each such ratchet plate will be bolted or otherwise suitably secured to a grouser plate and the associated guide adjustably secured to an adjacent grouser. By the use of rubber, as set forth, the several parts are not only permanently attached together but the cable, attachment members and walls of the grooves are protected against rusting due to moisture. The rubber envelops around the portions of the cables intermediate the guides and ratchet blocks shield these portions against mechanical shock and abrasion and lengthen the useful life of the device. Furthermore, the attached ratchet block, guide and connecting element comprise together a convenient replacement unit. To number of separate elements of the device is also reduced.

Having thus described the invention, what is claimed as new and desired to be secured by Letters Patent is:

1. A traction device for attachment to a vehicle wheel of the dual tire type, said device comprising a series of spaced grousers each having a plate portion and a central guide portion, and a series of connecting members alternating with the grousers, each such member connecting the plate portion of one grouser to the guide portion of the next adjacent grouser.

2. A grouser comprising one member of a traction device for attachment to a vehicle wheel of the dual tire type comprising, a plate or shoe, a guide positioned centrally upon one side of the shoe and adapted to project between two tires when the plate is operatively positioned, a bolt passing through a slot in the shoe for attaching the guide to the shoe in any one of a number of positions, a screw jack for adjusting the position of the guide, and a connecting member having one end attached to the guide.

3. The combination set forth in claim 2 in which the interengaging surfaces of the guide and plate are serrated.

4. The combination set forth in claim 2 in which the screw jack is positioned to act upon said bolt and to move the bolt and guide simultaneously relatively to the shoe when the bolt is loosened.

5. The combination set forth in claim 2 in which the screw jack comprises a screw bolt rotatably mounted upon the shoe but held against axial movement relatively thereto, and a sleeve slidably but non-rotatably mounted on the shoe, the sleeve being interiorly threaded and the threads thereof engaging the threads of the screw bolt.

6. A traction device for attachment to a vehicle wheel of the dual wheel type comprising a plurality of spaced grousers and a plurality of connecting members alternating therewith, each connecting member comprising a U-shaped flexible cable and mid-point of which is connected to one grouser and the ends of which are connected to the next adjacent grouser.

7. A traction device comprising spaced ground and tire engaging elements, and a plurality of devices formed separately from the said elements and alternating therewith for connecting the elements into a continuous band, each such device comprising two parallel reaches of flexible cable, a tubular envelope of rubber enclosing each cable reach, and a web of rubber connecting said envelopes.

8. A traction device comprising spaced ground and tire engaging elements, and a plurality of devices formed separately from the said elements and alternating therewith for connecting the elements into a continuous band, each such device comprising a single flexible cable having its mid portion secured to one element, its ends to another element, and remaining portions disposed in parallelism, the parallel reaches of the cable being individually enveloped in tubular rubber casings and said rubber casings being connected by a rubber web.

9. The combination set forth in claim 8 in which the ends and mid point are received in recesses formed within said elements and rubber also within said recesses in vulcanized to the walls thereof and to said cable parts.

CAMILLE P. GALANOT.
JAMES A. WATSON, Jr.